(12) United States Patent
Gorgees

(10) Patent No.: US 11,272,144 B2
(45) Date of Patent: Mar. 8, 2022

(54) LARGE VEHICLE BACKUP CAMERA APPARATUS

(71) Applicant: George Gorgees, Sterling Heights, MI (US)

(72) Inventor: George Gorgees, Sterling Heights, MI (US)

( * ) Notice: Subject to any disclaimer, the term of this patent is extended or adjusted under 35 U.S.C. 154(b) by 0 days.

(21) Appl. No.: 16/743,011

(22) Filed: Jan. 15, 2020

(65) Prior Publication Data

US 2021/0218934 A1    Jul. 15, 2021

(51) Int. Cl.
| | | |
|---|---|---|
| *B60R 1/00* | (2006.01) | |
| *B60R 11/00* | (2006.01) | |
| *B60R 11/04* | (2006.01) | |
| *B60R 16/033* | (2006.01) | |
| *H04N 7/18* | (2006.01) | |
| *H04N 5/225* | (2006.01) | |
| *G03B 17/08* | (2021.01) | |
| *G03B 17/56* | (2021.01) | |
| *G02B 13/06* | (2006.01) | |
| *G01C 3/08* | (2006.01) | |

(52) U.S. Cl.
CPC ............ *H04N 7/185* (2013.01); *B60R 1/002* (2013.01); *B60R 11/04* (2013.01); *G03B 17/08* (2013.01); *G03B 17/561* (2013.01); *H04N 5/2252* (2013.01); *H04N 5/2253* (2013.01); *B60R 16/033* (2013.01); *B60R 2011/004* (2013.01); *B60R 2011/0057* (2013.01); *B60R 2011/0063* (2013.01); *B60R 2300/806* (2013.01); *G01C 3/08* (2013.01); *G02B 13/06* (2013.01); *H04N 5/2256* (2013.01)

(58) Field of Classification Search
None
See application file for complete search history.

(56) References Cited

U.S. PATENT DOCUMENTS

| | | | |
|---|---|---|---|
| 5,027,200 | A | 6/1991 | Petrossian |
| 5,126,778 | A * | 6/1992 | Wheeler .................. G03B 7/16 396/106 |
| 5,761,540 | A * | 6/1998 | White ................ G01N 21/8806 396/4 |
| 6,690,413 | B1 | 2/2004 | Moore |
| 6,880,941 | B2 | 4/2005 | Suggs |
| 7,877,003 | B2 * | 1/2011 | Dunn .................. G01N 21/8806 396/4 |
| 8,670,035 | B2 | 3/2014 | Robert |
| 9,637,051 | B2 | 5/2017 | Dayan |
| 10,730,439 | B2 * | 8/2020 | Haler ..................... H04N 5/775 |

(Continued)

*Primary Examiner* — Mohammad J Rahman

(57) ABSTRACT

A large vehicle backup camera apparatus for assisting tractor trailer and RV drivers while backing up includes a camera and at least one wide-angle light coupled to the camera housing. A transmitter coupled within the camera housing transmits video from the camera to a personal electronic device. A ferrous plate is coupled within the camera housing adjacent a housing back side of the camera housing. A mounting bracket has a magnet coupled there within. The magnet is selectively engageable with the ferrous plate to selectively engage a trailer rear of a tractor-trailer or long-towed RV that use and operate a 5th wheel mechanism, a gooseneck hitch, or any other hitch prone to sharp turning or jackknifing during reverse when towing.

8 Claims, 6 Drawing Sheets

(56) References Cited

U.S. PATENT DOCUMENTS

| | | | |
|---|---|---|---|
| 2003/0178809 A1* | 9/2003 | Anderson | B60D 1/36 |
| | | | 280/477 |
| 2006/0209190 A1* | 9/2006 | Walters | H04N 7/181 |
| | | | 348/148 |
| 2007/0216136 A1* | 9/2007 | Dietz | B60D 1/36 |
| | | | 280/477 |
| 2010/0073478 A1* | 3/2010 | Kalous | B60R 9/06 |
| | | | 348/148 |
| 2011/0216199 A1* | 9/2011 | Trevino | B60D 1/36 |
| | | | 348/148 |
| 2013/0107044 A1 | 5/2013 | Azevedo | |
| 2015/0353026 A1* | 12/2015 | Dayan | B60K 37/06 |
| | | | 348/148 |
| 2016/0297361 A1* | 10/2016 | Drazan | H04L 67/02 |
| 2017/0151846 A1* | 6/2017 | Wuergler | B60D 1/62 |
| 2017/0217372 A1* | 8/2017 | Lu | H04N 5/23293 |
| 2018/0338117 A1* | 11/2018 | Park | G06K 9/00805 |
| 2018/0365859 A1* | 12/2018 | Oba | B60R 1/00 |
| 2019/0033691 A1* | 1/2019 | Li | F16M 13/02 |
| 2019/0196304 A1* | 6/2019 | Jeske | F16M 11/041 |
| 2019/0302764 A1* | 10/2019 | Smith | B60R 1/003 |
| 2020/0001778 A1* | 1/2020 | Lotz | B60Q 1/40 |
| 2020/0082175 A1* | 3/2020 | Han | H04B 7/2621 |
| 2020/0134939 A1* | 4/2020 | Schell | G07C 5/0841 |
| 2020/0134942 A1* | 4/2020 | Root | B60C 23/127 |
| 2020/0338941 A1* | 10/2020 | Slade | B60R 16/0315 |

* cited by examiner

LARGE VEHICLE BACKUP CAMERA APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to vehicle cameras and more particularly pertains to a new vehicle cameras for assisting tractor-trailer and RV towers while backing up.

(2) Description of Related Art Including Information Disclosed Under 37 CFR 1.97 and 1.98

The prior art relates to vehicle cameras, particularly for assisting drivers while backing up. Most existing backup cameras are designed for regular vehicles, and thus require permanent or semi-permanent installation in a central location of the rear of the vehicle. Hardwiring to the camera is typical, as is a fixed viewing monitor within the dashboard or rearview mirror. Large vehicles, specifically tractors-trailers and long-tow RVs that use and operate a 5th wheel mechanism, a gooseneck hitch, or any other hitch prone to sharp turning or jackknifing during reverse when towing, have a significantly larger blind spot on the rear passenger side. Drivers of such vehicles may have a different tow vehicle used with multiple trailers and thus do not want a permanent installation.

BRIEF SUMMARY OF THE INVENTION

An embodiment of the disclosure meets the needs presented above by generally comprising a camera housing and a camera coupled within the camera housing. The camera has a lens extending through a housing front side of the camera housing. At least one wide-angle light is coupled to the housing front side of the camera housing. A battery is coupled within the camera housing and is in operational communication with the camera and the wide-angle lights. A transmitter is coupled within the camera housing and is in operational communication with the camera and configured to transmit video to a personal electronic device. A ferrous plate is coupled within the camera housing adjacent a housing back side of the camera housing. A mounting bracket has a magnet coupled there within. The magnet is selectively engageable with the ferrous plate and is configured to selectively engage a trailer rear of a tractor-trailer or long-towed RV.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
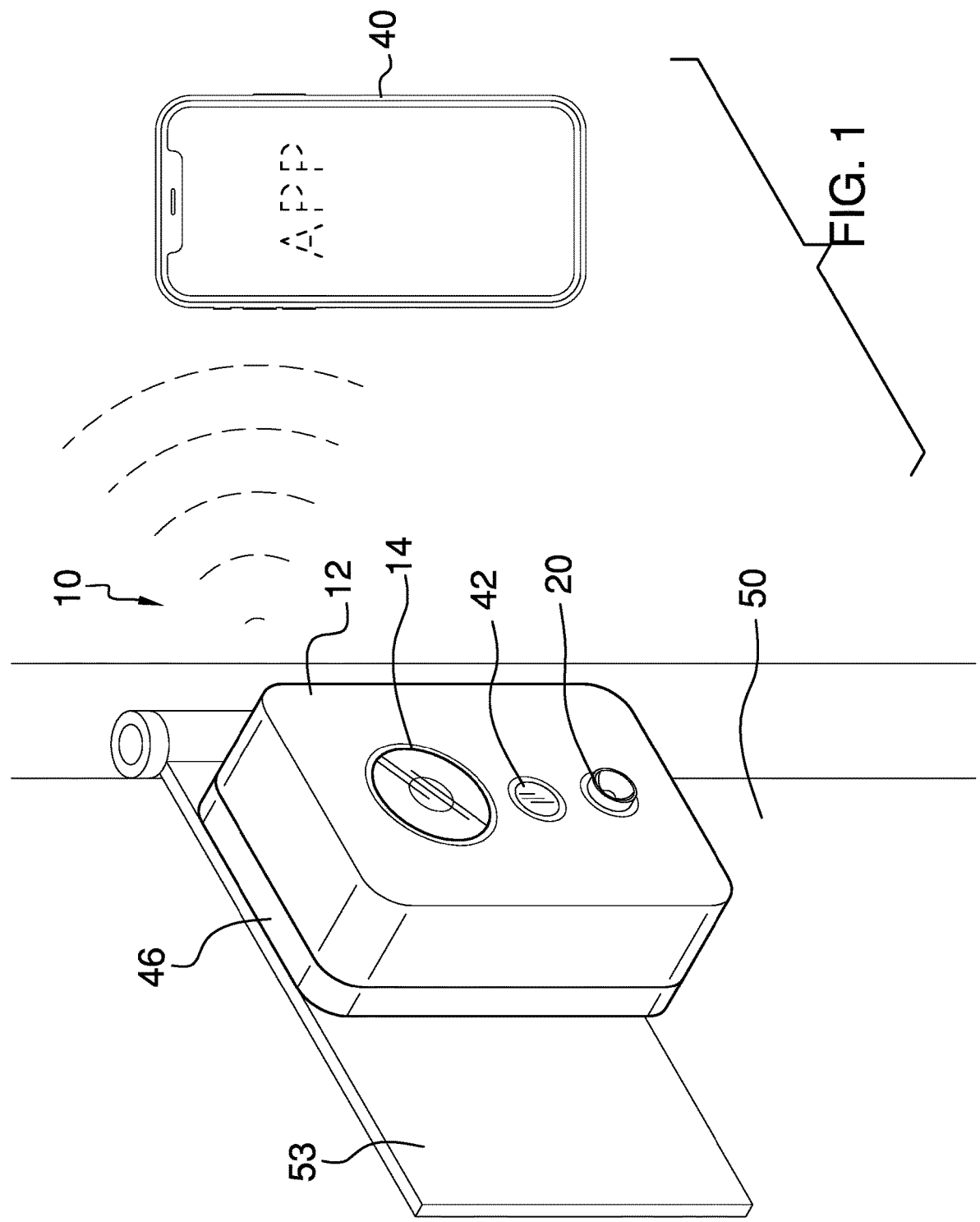
FIG. 1 is an isometric view of a large vehicle backup camera apparatus according to an embodiment of the disclosure.
Figure 2:
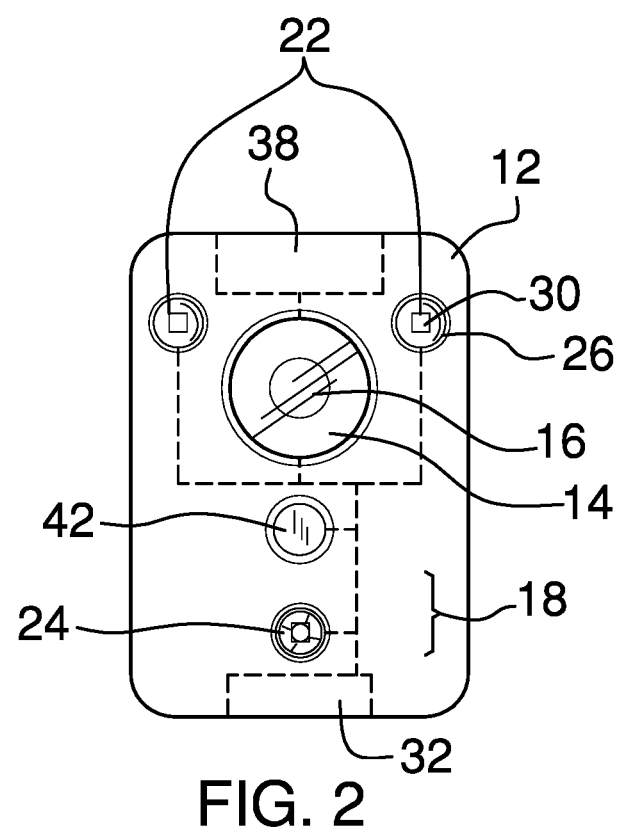
FIG. 2 is a front elevation view of an embodiment of the disclosure.
Figure 3:
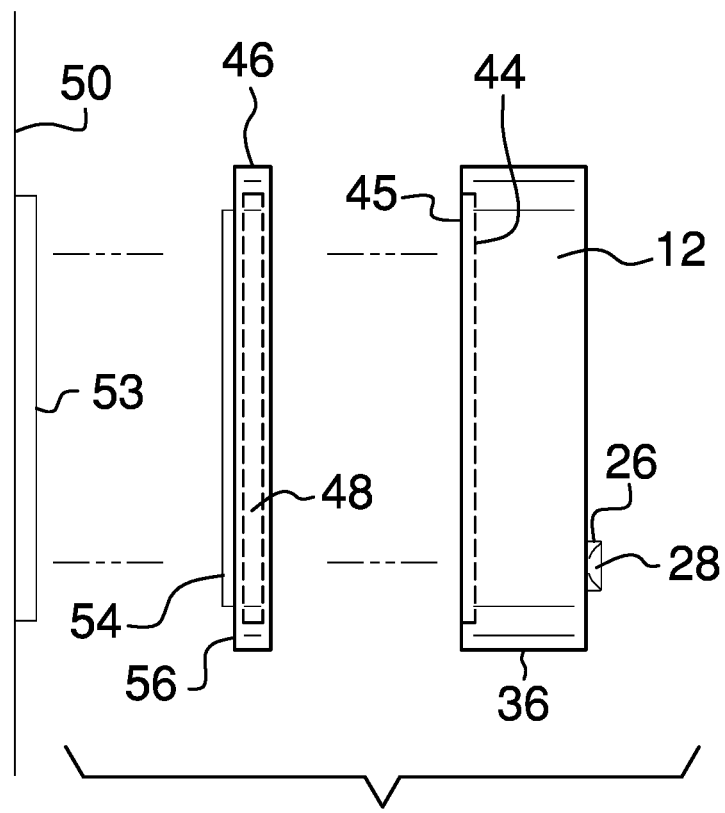
FIG. 3 is a side elevation view of an embodiment of the disclosure.
Figure 4:
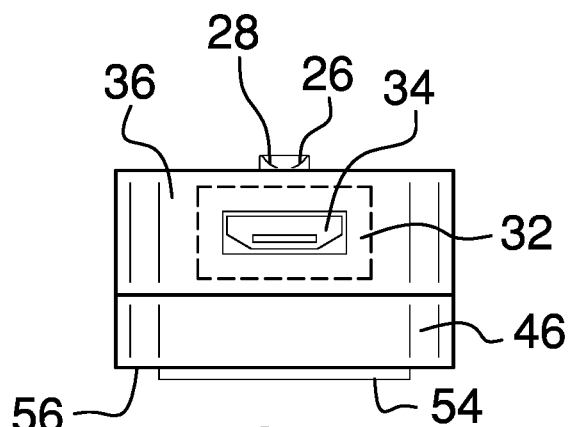
FIG. 4 is a bottom plan view of an embodiment of the disclosure.
Figure 5:
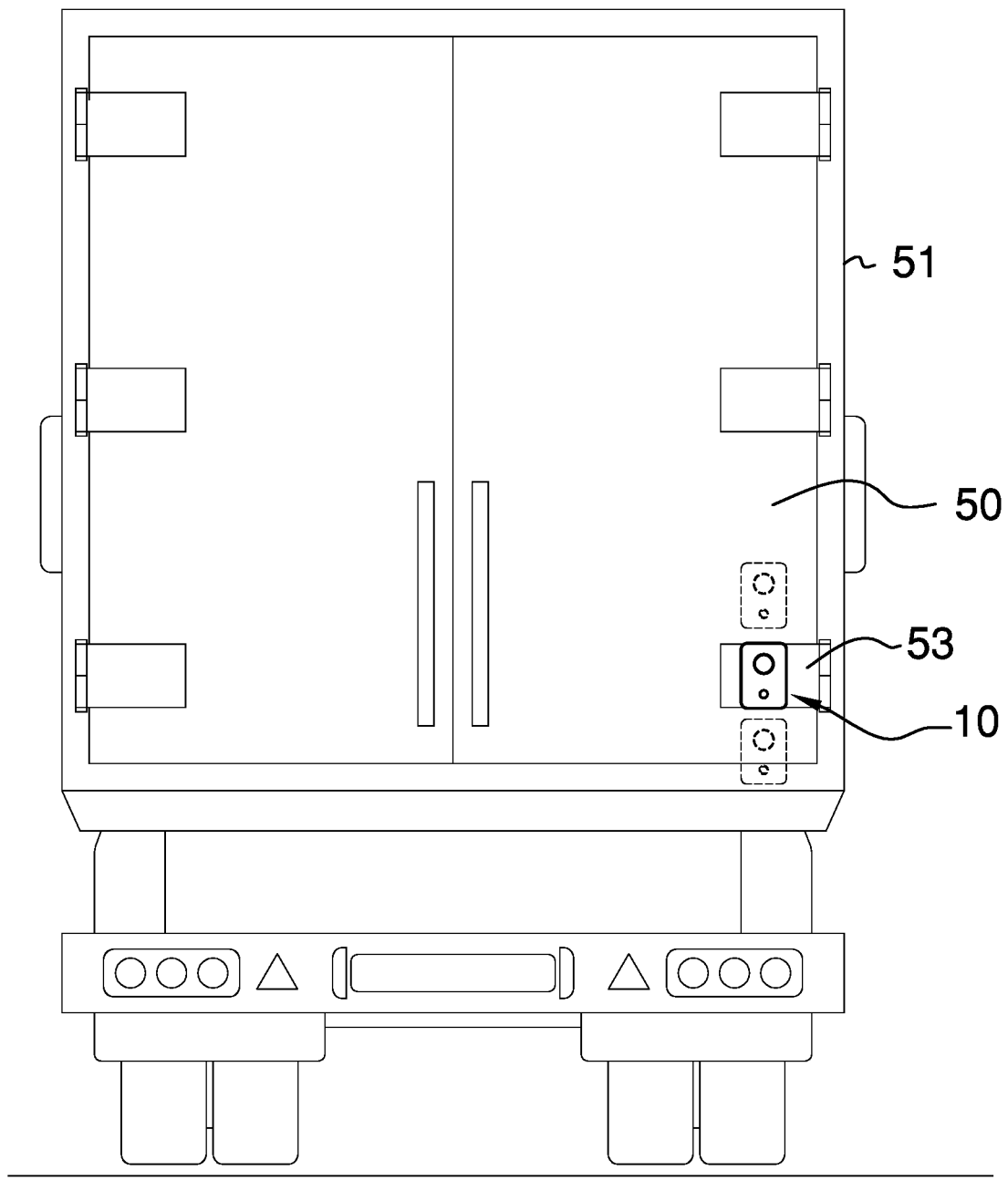
FIG. 5 is an in-use view of an embodiment of the disclosure.
Figure 6:
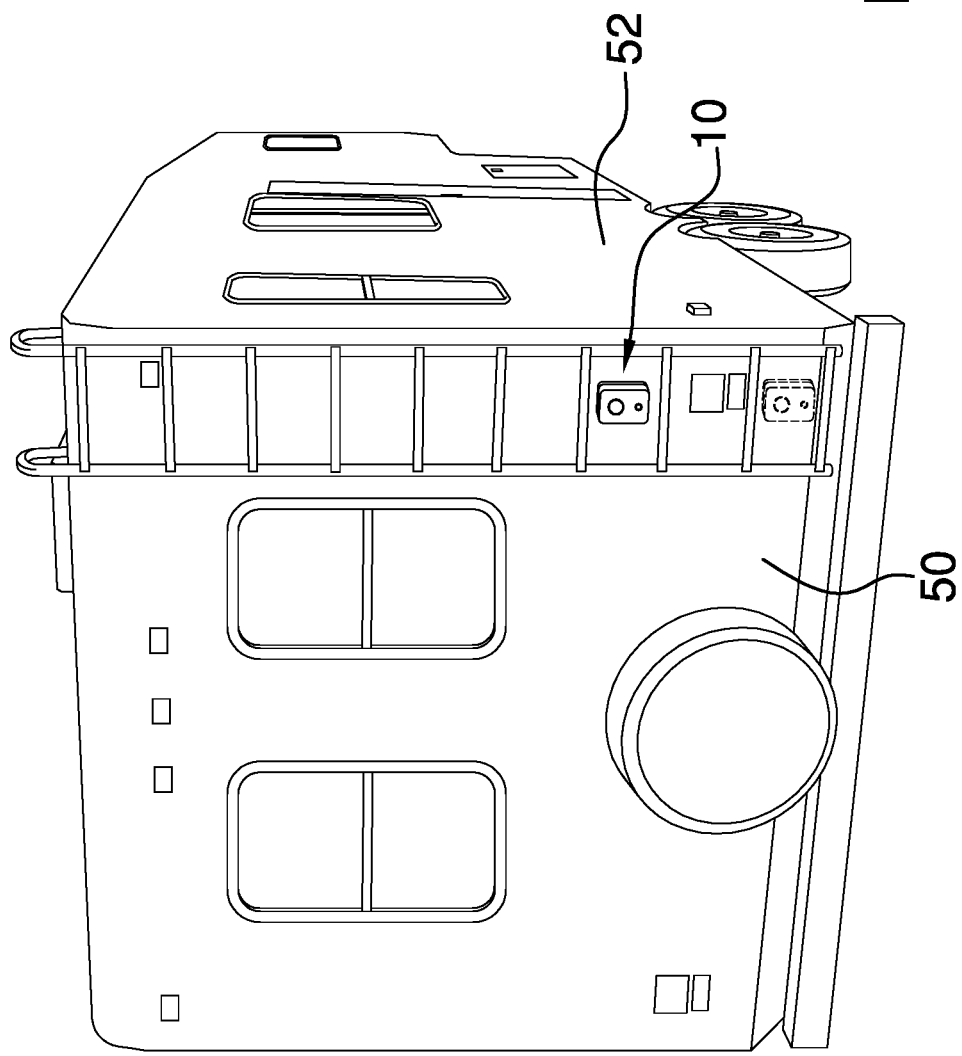
FIG. 6 is an in-use view of an embodiment of the disclosure.
Figure 7:
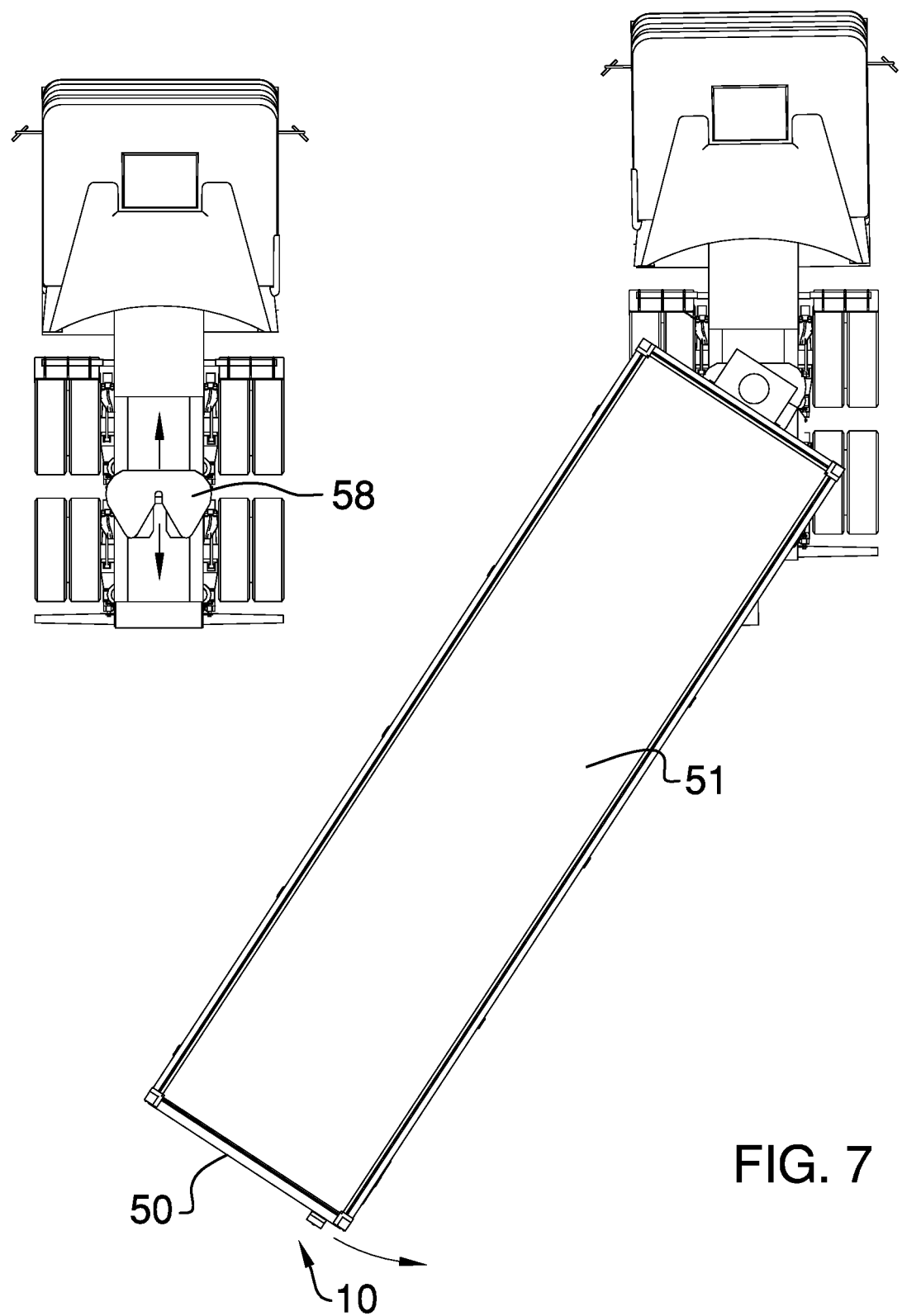
FIG. 7 is an in-use view of an embodiment of the disclosure.

With reference now to the drawings, and in particular to FIGS. 1 through 7 thereof, a new vehicle cameras embodying the principles and concepts of an embodiment of the disclosure and generally designated by the reference numeral 10 will be described.

As best illustrated in FIGS. 1 through 7, the large vehicle backup camera apparatus 10 generally comprises a camera housing 12. The camera housing 12 may be rectangular prismatic and has rounded corners. The camera housing 12 may be watertight and generally weatherproof. A camera 14 is coupled within the camera housing 12 and has a lens 16 extending through a housing front side 18 of the camera housing. The lens 16 may be a fisheye to achieve a wide viewing angle.

At least one wide-angle light 20 is coupled to the housing front side 18 of the camera housing to provide more light than the vehicle reverse lights relied on by most backup cameras. The at least one wide-angle light 20 may include a pair of upper lights 22 and a medial lower light 24. Each wide-angle light 20 may have a cylindrical light diffuser 26 extending from the housing front side 18 and a conical recession 28 within the light diffuser 26 to create the widest possible illuminated area from a diode 30 behind the diffuser 26. A battery 32 is coupled within the camera housing 12 and is in operational communication with the camera 14 and the wide-angle lights 20. The battery 32 may be rechargeable and may have a charging port 34 extending through a housing bottom side 36 of the camera housing to make the apparatus 10 a portable rechargeable device.

A transmitter 38 is coupled within the camera housing 12 and is in operational communication with the camera 14 to transmit video to a personal electronic device 40. The transmitter 38 may operate using Wi-Fi, Bluetooth, radio, or other wireless transmission technology to stream video to the personal electronic device 40. The personal electronic device 40 may utilize a proprietary application downloaded to the user's cellphone or tablet, or may be a dedicated monitor device. A distance laser 42 may be coupled to the camera housing 12 and extends through the housing front side 18. The distance laser 42 is configured to measure a distance to the nearest object and is in operational communication with the transmitter 38 to relay that information to the personal electronic device 40. The personal electronic device 40 may then create an auditory cue for the user when approaching an object and may display the exact distance until contact.

A ferrous plate 44 is coupled within the camera housing 12 adjacent a housing back side 45 of the camera housing. A mounting bracket 46 has a magnet 48 coupled there within. The magnet 48 selectively engages the ferrous plate 44 to secure the camera housing 12 to the mounting bracket 46. The magnet 48 is also configured to selectively engage a trailer rear 50 of a tractor-trailer 51 or long-towed RV 52. The magnet 48 may be positioned on a door hinge 53 of the trailer rear 50. The mounting bracket 46 is placed towards the lower right corner of the trailer rear 50 to position the apparatus 10 closest to the vehicle's largest blind spot. In case the mounting bracket 46 is to be placed on a non-ferrous portion of the trailer rear 50, an adhesive layer 54 may be coupled to a bracket back side 56 of the mounting bracket. The perimeter of the mounting bracket 46 may conform to the perimeter of the camera housing 12 to minimize the overall profile of the apparatus 10 when installed.

In use, the mounting bracket 46 is installed on the trailer rear 50 of the tractor-trailer 51 or long-towed RV 52 utilizing a fifth-wheel 58, a gooseneck hitch, or any other hitch prone to sharp turning or jackknifing during reverse. The mounting bracket 46 couples with either with the adhesive layer 54 or using the magnet 48. The ferrous plate 44 within the camera housing 12 is then engaged with the magnet 48. The user may then watch a live video feed from the camera 14 on the personal electronic device 40 from within the vehicle while backing up to prevent accidents. When finished driving, the user may remove the camera housing 12 for safekeeping, to be placed on a different trailer 52 or long-towed RV 52, or to charge the battery 32 via the charging port 34.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A large vehicle backup camera apparatus comprising:
    a camera housing;
    a camera coupled within the camera housing, the camera having a lens extending through a housing front side of the camera housing;
    at least one wide-angle light coupled to the housing front side of the camera housing;
    a battery coupled within the camera housing, the battery being in operational communication with the camera and the wide-angle lights;
    a transmitter coupled within the camera housing, the transmitter being in operational communication with the camera and configured to transmit video to a personal electronic device;
    a ferrous plate coupled within the camera housing, the ferrous plate being coupled adjacent a housing back side of the camera housing; and
    a mounting bracket, the mounting bracket having parallel opposite faces wherein the mounting bracket defines a plate shape, the mounting bracket having a magnet coupled to and positioned within the mounting bracket, the magnet selectively engaging with the ferrous plate and being configured to selectively engage a trailer rear of a tractor-trailer or long-towed RV.

2. The large vehicle backup camera apparatus of claim 1 further comprising the at least one wide-angle light including a pair of upper lights and a medial lower light.

3. The large vehicle backup camera apparatus of claim 1 further comprising a distance laser coupled to the camera housing, the distance laser extending through the housing front side and being in operational communication with the transmitter.

4. The large vehicle backup camera apparatus of claim 1 further comprising the camera housing being rectangular prismatic and having rounded corners.

5. The large vehicle backup camera apparatus of claim 1 further comprising the perimeter of the mounting bracket conforming to the perimeter of the camera housing.

6. The large vehicle backup camera apparatus of claim 1 further comprising each wide-angle light having a cylindrical light diffuser extending from the housing front side, the light diffuser having a conical recession.

7. The large vehicle backup camera apparatus of claim 1 further comprising an adhesive layer coupled to a bracket back side of the mounting bracket, the adhesive layer being configured to engage a non-ferrous portion of the trailer rear.

8. A large vehicle backup camera apparatus comprising:
a camera housing, the camera housing being rectangular prismatic and having rounded corners;
a camera coupled within the camera housing, the camera having a lens extending through a housing front side of the camera housing;
at least one wide-angle light coupled to the housing front side of the camera housing, the at least one wide-angle light including a pair of upper lights and a medial lower light, each wide-angle light having a cylindrical light diffuser extending from the housing front side, the light diffuser having a conical recession;
a battery coupled within the camera housing, the battery being in operational communication with the camera and the wide-angle lights;
a transmitter coupled within the camera housing, the transmitter being in operational communication with the camera and configured to transmit video to a personal electronic device;
a distance laser coupled to the camera housing, the distance laser extending through the housing front side and being in operational communication with the transmitter;
a ferrous plate coupled within the camera housing, the ferrous plate being coupled adjacent a housing back side of the camera housing; and
a mounting bracket, the mounting bracket having parallel opposite faces wherein the mounting bracket defines a plate shape, the mounting bracket having a magnet coupled to and positioned within the mounting bracket, the magnet selectively engaging with the ferrous plate and being configured to selectively engage a trailer rear of a tractor-trailer or long-towed RV, an adhesive layer coupled to a bracket back side of the mounting bracket, the adhesive layer being configured to engage a non-ferrous portion of the trailer rear, the perimeter of the mounting bracket conforming to the perimeter of the camera housing.

* * * * *